United States Patent [19]

Spencer et al.

[11] 3,789,558

[45] Feb. 5, 1974

[54] TRAILER HOME JACK AND METHOD OF OPERATING THE SAME

[76] Inventors: Herbert E. Spencer; Tommy S. Mitchell, both of Rt. 4, Hot Springs, Ark. 72204

[22] Filed: Nov. 26, 1971

[21] Appl. No.: 202,090

[52] U.S. Cl.................. 52/143, 52/741, 52/749, 214/1 H, 214/152, 254/92
[51] Int. Cl......... E04h 1/12, E04g 1/24, B65g 7/02
[58] Field of Search........... 280/150.5; 214/152.1 H; 254/92; 52/143, 741, 749

[56] References Cited
UNITED STATES PATENTS

| | | | |
|---|---|---|---|
| 2,004,095 | 6/1935 | Hankins et al. | 214/38 B |
| 3,552,707 | 1/1971 | Tanaka | 248/419 X |
| 3,587,890 | 6/1971 | Hyland | 214/1 H |

FOREIGN PATENTS OR APPLICATIONS

| | | | |
|---|---|---|---|
| 513,262 | 10/1939 | Great Britain | 248/419 |

Primary Examiner—Alfred C. Perham
Attorney, Agent, or Firm—Zarley, McKee & Thomte

[57] ABSTRACT

A trailer home is moved into side by side contiguous relationship with another trailer home by placing two pairs of telescopically extendable members transversely under the first trailer home. A pair of vertically disposed ground engaging jacks engage the lower member of each pair of telescoping members and the top member engages the bottom of the first trailer home. A horizontally disposed jack connected between each of the telescoping members allows the first trailer home to be moved toward the second trailer home after the vertical jacks have been operated to raise the trailer home such that the transport wheels are out of ground engagement. A stationary support is then placed under the first trailer home and the jack structure is lowered and removed.

3 Claims, 7 Drawing Figures

Patented Feb. 5, 1974
3,789,558
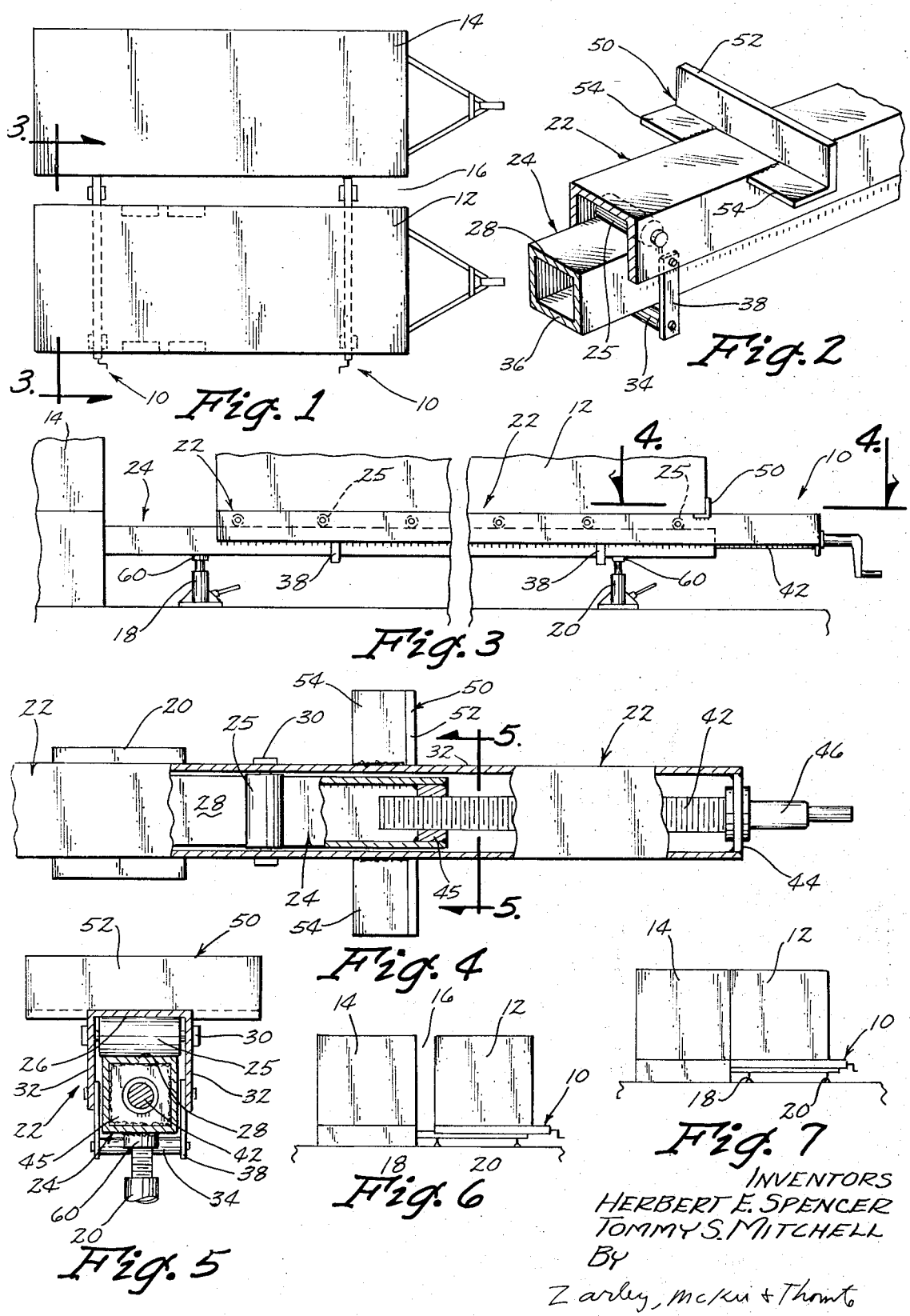
INVENTORS
HERBERT E. SPENCER
TOMMY S. MITCHELL
BY
Zarley, McKee & Thomte
ATTORNEYS

TRAILER HOME JACK AND METHOD OF OPERATING THE SAME

Many times it is desirable to connect trailer homes together and provide interconnecting passageways therebetween. Usually the trailer homes are positioned parallel to each other in side by side relationship. Equipment and procedures available for this job have been very crude and unsatisfactory. The trailer homes may be pulled into reasonably close proximity of each other but inevitably a space of between 12 and 15 inches will remain. The trailer home jack of this invention and method of operating the same allows for one of the trailer homes to be moved this distance into engagement with the other trailer home. The levelling of the trailer home is also readily accomplished through the use of the trailer jack structure.

The jack structure involves a pair of telescoping elongated members at the front and rear ends of the trailer extending transversely thereof with a top telescoping member engaging the bottom of the trailer home while the bottom telescoping member engages a pair of vertically disposed jacks. A horizontally disposed jack interconnects the upper and lower telescoping members such that upon being operated the upper member moves relative to the lower member and thus the trailer home moves towards or away from the other trailer home. Permanent static supports are then placed under the trailer home just moved and the vertical jacks are lowered allowing the supporting telescoping members and vertical jack to be removed. It is seen that the alignment of the trailer home being moved is also readily accomplished by selectively varying the amount of travel of each of the horizontally disposed jacks in much the same manner as the vertical levelling is accomplished.

The telescoping members include a top downwardly facing channel member embracing a lower rectangular in cross section member and rollers are provided therebetween engaging the top of the lower member and the lower face of the base of the channel member. Rollers are provided along the bottom of the lower member and include upwardly extending legs secured to the downwardly extending side walls of the channel member thus limiting relative vertical movement between the telescoping members.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a top plan view of two trailer homes in side by side relationship with the jack structure in position under one of the trailer homes prior to being operated to move the one home into mating engagement with the other home.

FIG. 2 is a fragmentary perspective view of the telescoping transversely disposed support members.

FIG. 3 is a fragmentary side elevation view taken along line 3 — 3 in FIG. 1.

FIG. 4 is a fragmentary view taken along line 4 — 4 in FIG. 3.

FIG. 5 is a cross sectional view taken along line 5 — 5 in FIG. 4, and

FIGS. 6 and 7 are reduced in scale end views of the two trailer homes before and after the jack structure has been operated.

The trailer home jack assembly of this invention includes front and rear jack assemblies 10, as seen in FIG. 1, under a trailer home 12 positioned adjacent a stationary trailer home 14. The spacing between the trailer homes will ordinarily be between 12 and 15 inches as indicated at 16.

As best seen in FIG. 3, the jack assembly 10 includes two spaced apart vertical jack units 18 and 20 which may be individually operated mutually to level the trailer 12 with the trailer 14. A beam extends between and on each of the jacks 18 and 20 and supports the bottom of the trailer home 12. The beam includes an upper downwardly facing channel member 22 in which a lower square in cross section member 24 is received. A plurality of rollers 25 are positioned between the telescoping members to engage the bottom face of the base wall 26 of the channel-shaped member 22 and the top wall 28 of the lower member 24, as seen in FIG. 5. The rollers are held in place on pins 30 secured to the oppositely disposed channel side walls 32.

Vertical movement between the telescoping members 22 and 24 is limited by a plurality of rollers 34 engaging the bottom wall 36 of the member 24 and held in place by upwardly extending arms 38 anchored to the downwardly extending side walls 32 of the channel member 22.

The telescoping action is accomplished by a horizontally disposed screw jack 40 which includes a threaded shaft 42 rotatably carried in the outer end wall 44 of the upper channel member 22, as seen in FIG. 4. The inner end of the threaded shaft 42 engages a threaded nut 45 in the outer end of the lower member 24. A crank 46 connected to the outer end of the threaded shaft 42 may be manually operated to telescope the members inwardly and outwardly.

The weight of the trailer home 12 on the upper member 22 will maintain the home in position on the beam, however, the beam in FIG. 2 is seen to have a stop plate 50 rigidly mounted on the upper member 22 for engagement with the outer bottom edge of the home 12, as seen in FIG. 3. The stop plate 50 comprises an upwardly extending cross plate 52 having horizontal portions 54 rigidly connected by weldments to opposite side walls 32 of the member 22 to provide a continuous supporting surface for the bottom of the trailer home.

The vertically disposed jacks 18 and 20 are also held in place by the weight of the load carried but an extra margin of safety is provided by a downwardly extending sleeve 60 being provided on the bottom wall 36 of the lower member 24 such that the upper jack member is received in the sleeve and cannot become disengaged while a load is on the jack.

In operation it is seen that the trailer 12 will be driven as close as possible to the trailer 14, as seen in FIGS. 1 and 6. The transversely extending beams will then be placed in position under the forward and rearward ends of the home 12 on the vertical jacks 18 and 20. The trailer home 12 can now be levelled at this time with the adjacent home 14 by operation of the vertical jacks 18 and 20. The horizontally disposed jacks 40 are now operated by turning the handles 46 which will cause the upper telescoping member 22 to move toward the home 14 on the lower telescoping member 24 thus causing the home 12 to be carried into mating engagement with the adjacent side wall of the home 14, as seen in FIG. 7. The forward and rearward horizontally disposed jacks 40 are operated individually in order to obtain mating engagement between the adjacent homes along their entire length. Now permanent stationary supports may be placed under the trailer home 12 and the vertical jacks 18 and 20 can be lowered allowing the beams to be removed. The operation is smooth and easy to accomplish by maximizing the control over the operation in that adjustments are possible vertically through operation of the vertically disposed jacks 18 and 20 on each of the beams and operation of the horizontally disposed jacks 40. The rollers 25 carry the load and eliminate most of the friction between the telescoping members 22 and 24. The rollers 34 prevent the telescoping members 22 and 24 from becoming disengaged. The stop plate 50 on each of the beams prevents any slipping from occurring between the bottom of the trailer home and the beam as the trailer home is moved.

We claim:

1. In combination a trailer home and jack structure comprising, a trailer home having an elongated body and ground support wheels for moving said trailer home along a line parallel to the longitudinal axis of said trailer home, a horizontally disposed jack structure at each end of said trailer frame and each structure including upper and lower elongated telescoping members, said upper member supportingly engaging said trailer home transversely of its longitudinal axis, said upper member being a downwardly facing channel and said lower member being positioned in said channel, rollers being provided between and in engagement with the top surface of said lower member and the base of said channel, adjustment means interconnecting said upper and lower elongated telescoping members for moving said upper member relative to said lower member and moving said trailer home laterally, a vertically disposed ground engaging jack structure at each end of each horizontal jack structure and engaging said lower horizontally disposed jack member to maintain said trailer home at a desired height above the ground, said adjustment means including a longitudinally stationary threaded shaft rotatably secured to the outer end of said upper member and threadably engaging a threaded member on said lower member, and a hand operated handle being provided on the outer end of said threaded shaft.

2. The structure of claim 1 wherein stop means are provided on said upper member for engagement by said lower member to limit vertical movement therebetween.

3. The structure of claim 1 wherein said stop means includes a roller extending across the bottom side of said lower member and having upwardly extending legs connected to the downwardly extending side walls of said channel of said upper member.

* * * * *